United States Patent [19]

Kirby

[11] Patent Number: 4,556,120

[45] Date of Patent: Dec. 3, 1985

[54] MODULAR GAS-POWERED SUBSEA SEISMIC SOURCE

[75] Inventor: Robert A. Kirby, Houston, Tex.

[73] Assignee: Exxon Production Research Co., Houston, Tex.

[21] Appl. No.: 505,642

[22] Filed: Jun. 20, 1983

[51] Int. Cl.⁴ .................... G01V 1/137; G01V 1/38
[52] U.S. Cl. .................... 181/120; 181/118; 367/144
[58] Field of Search .................... 367/144, 145, 146; 181/110, 117, 118, 119, 120, 113, 115, 116

[56] References Cited

U.S. PATENT DOCUMENTS

| | | | |
|---|---|---|---|
| 3,307,285 | 3/1967 | Wells | 181/118 X |
| 3,434,561 | 3/1969 | Loper | 181/118 |
| 3,540,543 | 11/1970 | Bays | 181/120 |
| 3,601,216 | 8/1971 | Mott-Smith | 181/120 X |
| 3,653,460 | 4/1972 | Chelminski | 181/0.5 H |
| 3,658,149 | 4/1972 | Neal et al. | 181/0.5 NC |
| 4,007,804 | 2/1977 | Hardison et al. | 181/110 X |
| 4,016,952 | 4/1977 | Reed et al. | 181/110 X |
| 4,026,382 | 5/1977 | Field et al. | 181/117 |
| 4,141,431 | 2/1979 | Baird | 181/118 |
| 4,164,264 | 8/1979 | Fair | 181/119 |
| 4,180,139 | 12/1979 | Walker | 181/120 |
| 4,193,472 | 3/1980 | Kirby | 181/118 |
| 4,211,300 | 7/1980 | Miller | 181/120 |
| 4,240,518 | 12/1980 | Chelminski | 181/107 |
| 4,246,979 | 1/1981 | Thomson et al. | 181/120 |
| 4,253,539 | 3/1981 | Magneville | 181/120 |
| 4,271,924 | 1/1981 | Chelminski | 181/120 |
| 4,285,415 | 8/1981 | Paitson | 181/120 |
| 4,286,687 | 9/1981 | Fiske, Jr. | 181/120 |
| 4,294,328 | 10/1981 | Cholet et al. | 181/120 |
| 4,296,827 | 10/1981 | Thigpen et al. | 181/107 |
| 4,301,887 | 11/1981 | Fiske, Jr. | 181/107 |
| 4,303,141 | 12/1981 | Pascouet | 181/120 |
| 4,324,310 | 4/1982 | Wener et al. | 181/116 |
| 4,324,311 | 4/1982 | Farris | 367/144 X |
| 4,381,044 | 4/1983 | Kirby | 367/144 X |

Primary Examiner—Harold J. Tudor
Assistant Examiner—Brian S. Steinberger
Attorney, Agent, or Firm—David H. Vickrey

[57] ABSTRACT

The invention is a device known generically as an "air gun" suitable for producing a shock wave in a subsea environment during seismic prospecting. It is made up of a central chamber holding pressurized gas. The gas is released explosively into the water by moving a double acting shuttle. The shuttle seals the central gas chamber at each end of its stroke. A novel pneumatic actuator is also shown.

19 Claims, 12 Drawing Figures

MODULAR GAS-POWERED SUBSEA SEISMIC SOURCE

OBJECT OF THE INVENTION

This invention relates to an improved seismic energy source used to create pulses or shock waves in a liquid medium such as water. More particularly, it relates to a simple gas-powered apparatus which is easily operated, more reliable than those of the prior art, and whose signature and frequency spectrum can easily be modified.

BACKGROUND OF THE INVENTION

In prospecting in subsea and other areas underlying a body of water, it is desirable to provide a source of energy for propagating sonic pulses or shock waves into the water. Since water is a good conductor of sound, it normally is not necessary to generate pulses near the floor of the waterbody; they can be, and desirably are, produced near the water's surface. These pulses propagate down through the water, across the water-floor interface, into the subfloor geologic formations and are, to some extent, reflected back across the same path to an array of hydrophones waiting near the surface of the water. Analysis of the signals produced by hydrophones can provide information concerning the structure of the subfloor geological formations and attendant petroleum accumulation in those formations.

The term "water" as used herein is meant to include swampwater, mud, marshwater and any other liquid containing sufficient water to enable operation of the invention.

There are many ways of generating a sonic pulse in a liquid. For instance, explosives introduce strong pulses into the water and accordingly achieve substantial penetration into subfloor formations. Certain obvious drawbacks exist in their use: they are dangerous to store, handle, and use. When used in open water they kill marine life. In crowded areas such as harbors, explosives cannot be used at all. Explosives are orders of magnitude more expensive to use, on a per-shot basis, than are gas guns. Modification of the explosive source's sonic signature to achieve an acceptable spectrum distribution is difficult.

Another method of generating a sonic pulse is by discharge of a bank of capacitors through a subsurface electrode to produce a quickly collapsing gaseous bubble. However, the efficiency of this method is quite low in that only a few percent of the energy charged to the capacitors is found in the shock wave produced on discharge.

Apparatus using explosive gas mixtures, e.g., propane and air, to produce the sonic pulse have gained wide acceptance. The two major types of explosive gas guns are those which operate by exploding a gas mixture behind a flexible membrane which in turn is in contact with the water and those which operate by allowing the abrupt bubble from the gas explosion to pass directly into the water. An example of the former apparatus can be found in U.S. Pat. No. 3,658,149; and example of the latter can be found in U.S. Pat. No. 4,193,472.

Open guns using high pressure compressed gases, instead of an explosive mixture, have achieved a wide acceptance in the industry. Typical designs for open-ported compressed gas guns are found in U.S. Pat. No. 3,653,460 to Chelminski and U.S. Pat. No. 4,141,431 to Baird. These guns employ two pressurized chambers, i.e., a control chamber and a gas-holding chamber, which are sealed by a spool-shaped valve or shuttle. The gun is fired by abruptly releasing gas from the control chamber. The gas in the gas-holding chamber forces the shuttle into the control chamber and thereby simultaneously exposes the exhaust ports. These ports allow the gas stored in the gas-holding chamber to exit explosively into the water. The control chamber is then repressurized, thereby moving the shuttle back into a position sealing the gas-holding chamber. The gun is again ready to "fire."

Guns employing this design have certain liabilities which are quite difficult to correct. The period during which the exhaust ports are open after escape of the initial burst of gas is one in which no useful operation is performed. The initial burst of gas through the exhaust port is the one which produces the useful portion of the shock wave. Obviously the gas lost from the exhaust ports during the repositioning of the shuttle is wasted. The apparatus of the invention disclosed herein consumes a significantly smaller amount of compressed gas than do those of the prior art which have a shuttle which must reverse itself prior to firing. The mechanical stress on the shuttle of the invention is much less than on the reversing shuttle of the prior art.

A compressed gas gun eliminating several problems associated with prior guns is disclosed in U.S. Pat. Nos. 4,180,139 to Walker, issued in December, 1979 and No. 4,324,311, to Farris, issued Apr. 13, 1982. These patents disclose a gun having a single cylindrical gas chamber with central exhaust ports about its periphery. Inside the gas chamber resides a moveable shuttle also having ports about its center. When the shuttle is moved from one end of the gas chamber to the other end, via the action of an integrated actuator, the ports in the shuttle momentarily align with those in the gas chamber wall and allow an amount of compressed gas to escape. Once the shuttle reaches the other end, the gun is in position to "fire" again awaiting only the build-up of pressure in the gas chamber and actuating mechanism. Although this device has a number of advantages over those of the prior art, e.g., efficient compressed gas usage, the geometry of the device precludes any reasonably facile alteration in the frequency and spectrum distribution of the sonic pulse it produces. The two physical dimensions of the gun, i.e., exhaust port geometry and gas chamber size, defining the signature of the sonic pulse cannot be significantly changed.

In contrast, the present invention is designed not only to eliminate valving which must reverse itself prior to repressuring and firing, but also to provide a ready modification of the sonic signature should such be desired.

SUMMARY OF THE INVENTION

The inventive seismic source is made up of two major modular parts. The source module has a central gas-holding chamber surrounding a shuttle. The shuttle alternately seals exhaust ports located in opposite ends of the gas-holding chamber at the ends of its stroke. Pressurized gas is introduced into the gas-holding chamber and released by a mechanical pull or push on the shuttle. The pull or push is initiated by a modular double-acting pneumatic control actuator attached to the shuttle.

The two modular sections are configured so that a number of the source modules may be attached end to end and simultaneously fired by a single control actuator.

The end plates on the source modules have exhaust ports therethrough and may be easily changed. The gas-holding chamber wall may also be readily changed. Variation of the size of the exhaust ports and the chamber volume allows the signature of a single source module or a collection of source modules to be easily modified.

DESCRIPTION OF THE PREFERRED EMBODIMENT

The preferred embodiment of this gas-powered subsea seismic source has two distinct sections. The first is a source module which accumulates the pressurized gas used in producing the seismic pulse. The second portion is an actuator module which is used to fire the source module by releasing the pressurized gas contained therein. The source module typically has a single central gas-holding chamber which is cylindrical in shape. Round exhaust ports are found in the two ends of the cylinder. A shuttle having but two positions on its stroke is placed through the exhaust ports. The shuttle is configured so that it has a stroke with two stationary positions and therefore seals the exhaust ports on the gas-holding chamber in either of the two positions. Bearing mounts may be used to support the shuttle in an appropriate position relative to the exhaust ports.

Figure 1:
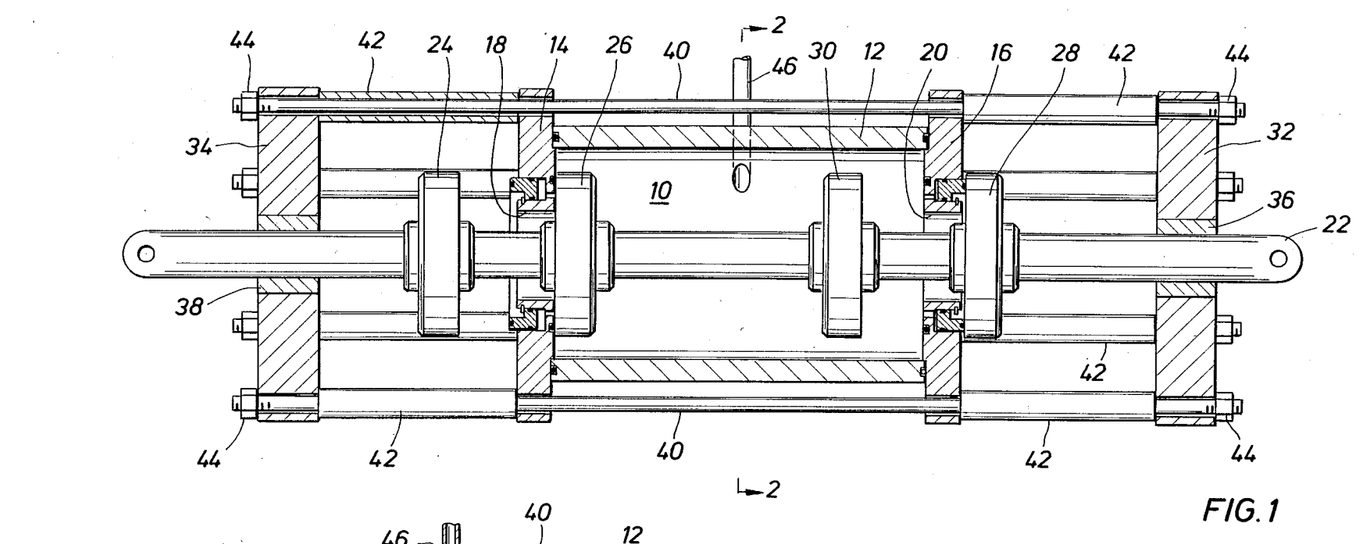
FIG. 1 is a partial cross sectional side view of a source module showing the shuttle in the left position.

One embodiment of the inventive source module is shown in cross sectional side view in FIG. 1. The pressurized gas volume 10 is formed of tubular element or hollow cylinder 12, left endplate 14, and right endplate 16. Each of endplates 14 and 16 have exhaust ports respectively, 18 and 20, through their center. The rest of gas volume 10 is defined by valve plates mounted on a central shuttle. The shuttle is made up of shuttle rod 22 which supports four shuttle valve plates. The left exhaust port 18 is alternately sealed by left outer valve plate 24 and left inner valve plate 26. Right exhaust port 20 is alternately sealed by right outer valve plate 28 and right inner valve plate 30. Shuttle rod 22 may be supported by right bearing mount 32 and left bearing mount 34. Bearing 36 is situated in bearing mount 34 and supports shuttle rod 22. Similarly, at the other end of shuttle rod 22, bearing 38 is situated within left bearing mount 34. Bearings 36 and 38 may be of any suitable type or may be of a suitable bushing material such as OILITE or TEFLON. The center line of bearings 36 and 38 should be generally collinear with that of left exhaust port 18 and right exhaust port 20.

The source module may be held together by a number of studs 40 which run through bearing mount 32, spacer 42, both endplates 14 and 16, another spacer 42, and the remaining bearing mount 34.

Figure 2:
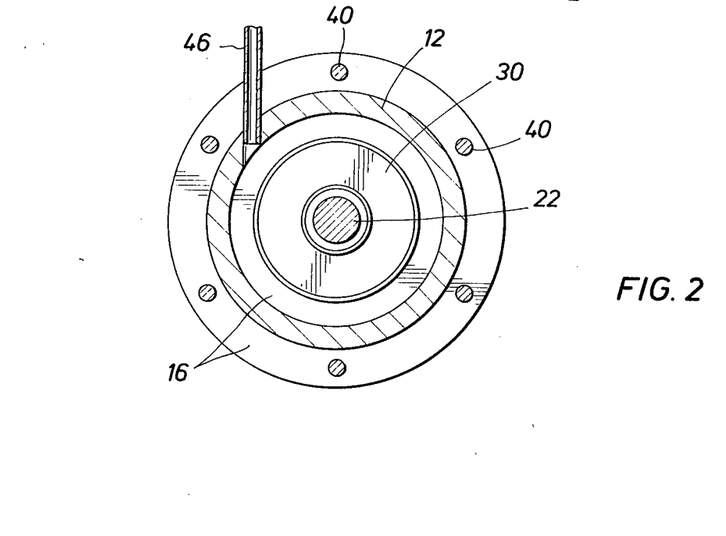
FIG. 2 is a cross sectional end view of the source module in FIG. 1 across the gas inlet line.

FIG. 2 shows a cross section of the source module of FIG. 1 taken across its midpoint. The FIGURE shows the desirably coaxial relationship of the right endplate 16, cylinder wall 12, right inner valve plate 30, and shuttle rod 22. Studs 40 are also shown as well as is gas inlet line 46.

Figure 3:
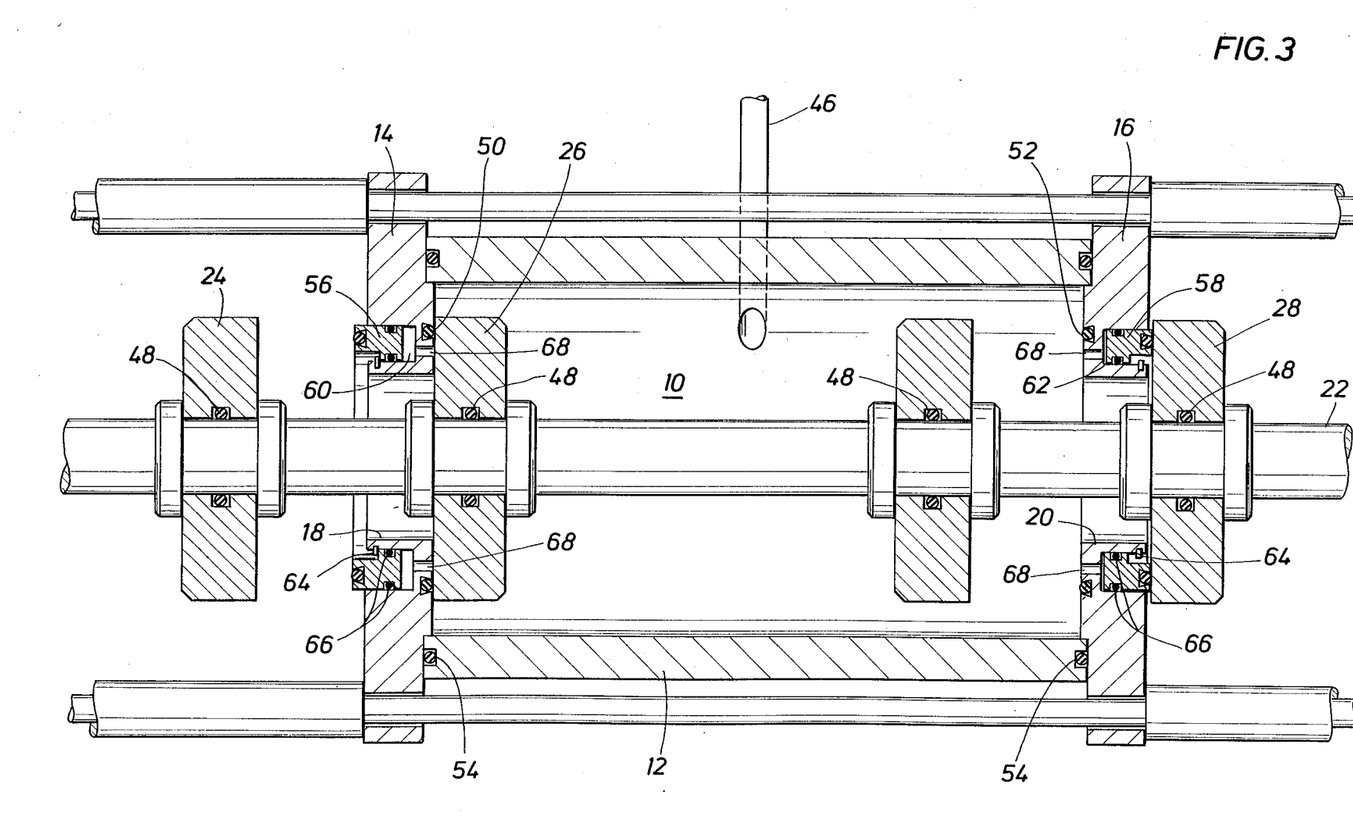
FIG. 3 is a partial cross sectional side view of the gas-holding chamber portion of the device in FIG. 1.

FIG. 3 shows, with more clarity, the center section of the device of FIG. 1. The seal arrangement is depicted in this drawing. O-rings 48 are placed beneath each of the inner and outer valve plates to prevent pressurized gas blow-by when the valve plates are in sealing position against endplates 14 and 16. O-rings 50 and 52 may be placed, respectively, in left endplate 14 and right endplate 16. These seals maintain contact with the respective valve plates when the plates are at rest. O-rings .54 may be placed in grooves residing on the end of cylinder 12 where it contacts left and right endplates 14, 16. A valuable addition to the source module is found in left moveable seal 56 and right moveable seal 58. These seals fit in circular grooves 60 and 62 cut in left and right endplates around the respective exhaust ports. The moveable seals are designed to fit snugly within the grooves and are held in place by retainers such as snap rings 64. The inner and outer periphery of each of the seals desirably have grooves with O-rings 66 or the like enclosed therein. The inside or bottom of grooves 60 and 62 have a number of small holes 68 leading into gas volume 10. These small holes 68 allow the gas pressure within volume 10 to move the respective left and right moveable seals outward to contact the inside face of either left outer valve plate 24 or right outer valve plate 28. Although the movable seals shown in FIG. 3 are maintained in a ready position by air pressure in gas volume 10, other known seal designs using, e.g., spring loading, may be used instead.

Note that with the shuttle in the position shown in FIG. 3, left inner valve plate 26 sits flush against O-ring 50 and near left endplate 14. However, right outer valve plate 28 is separated from right endplate 16 by a small distance. Right outer valve plate 28 is, however, in contact with right moveable seal 58. It is a good practice to have the diameter of the circle circumscribed by O-rings 50 and 52 on the inner valve plates slightly larger than the circle circumscribed by moveable seals 56 and 58 on the outer valve plates. Since force is equal to area times pressure, the force tending to keep the inner valve plate against the inside face of left or right endplates 14 or 16 will be slightly larger than the force acting against the outer valve plates 24 or 28.

Figure 7:
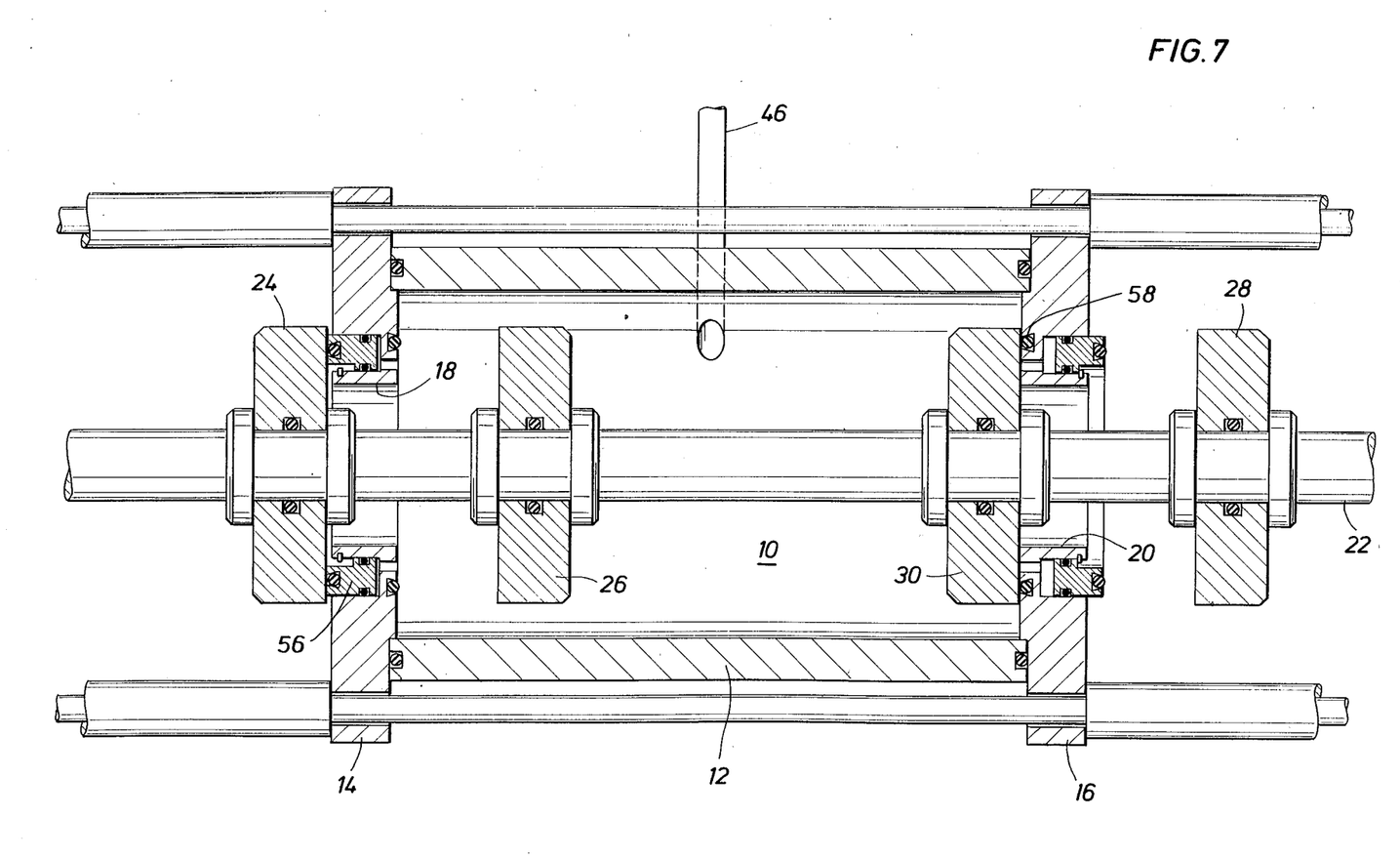
FIG. 7 is a partial cross sectional side view of the gas-holding chamber portion of the device in FIG. 1. The shuttle is in the position at the opposite end of the stroke shown in FIG. 3.
Figure 8:
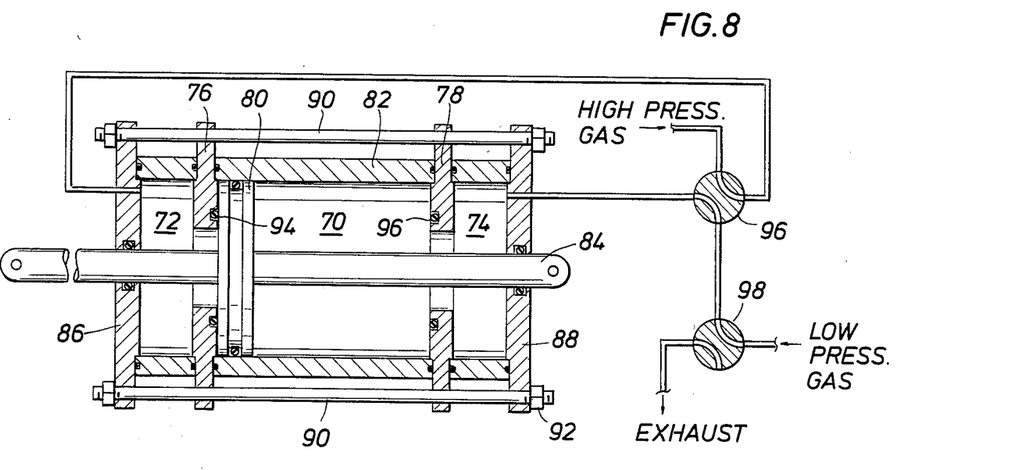
FIGS. 8, 9, 9A, and 10 show the actuator module in partial cross sectional side view and the operating pneumatic control valves in schematic view.

The device is simple in operation. The shuttle, by one manner or another, is placed at one end of a stroke. Using for the purposes of illustration, the shuttle position shown both in FIGS. 1 and 3, left inner valve plate 26 seals against left endplate 14 and right outer valve plate 28 seals against moveable seal 58. An amount of high pressure gas, usually of 2,000 lbs. per square inch or greater, is introduced through gas inlet line 46. When a sufficient amount of gas has been introduced into gas volume 10, shuttle rod 22 is given a tug towards the right. The force required to move shuttle rod 22 should be not much greater than the difference in the two forces created by the pressure on seals 50 and 58 as noted above. In any event, the gas will explosively discharge into the surrounding water as is shown by the arrows in FIG. 4. The actuator should then continue moving shuttle rod 22 to the right until it reaches the position shown in FIG. 7. In this position, right inner valve plate 30 is in contact with the O-ring 58 in right endplate 16. Left outer valve plate 24 is sealed against left moveable seal 56. The step of repressuring gas volume 10 through gas inlet 46 may be then restarted for subsequent firing.

Figure 4:
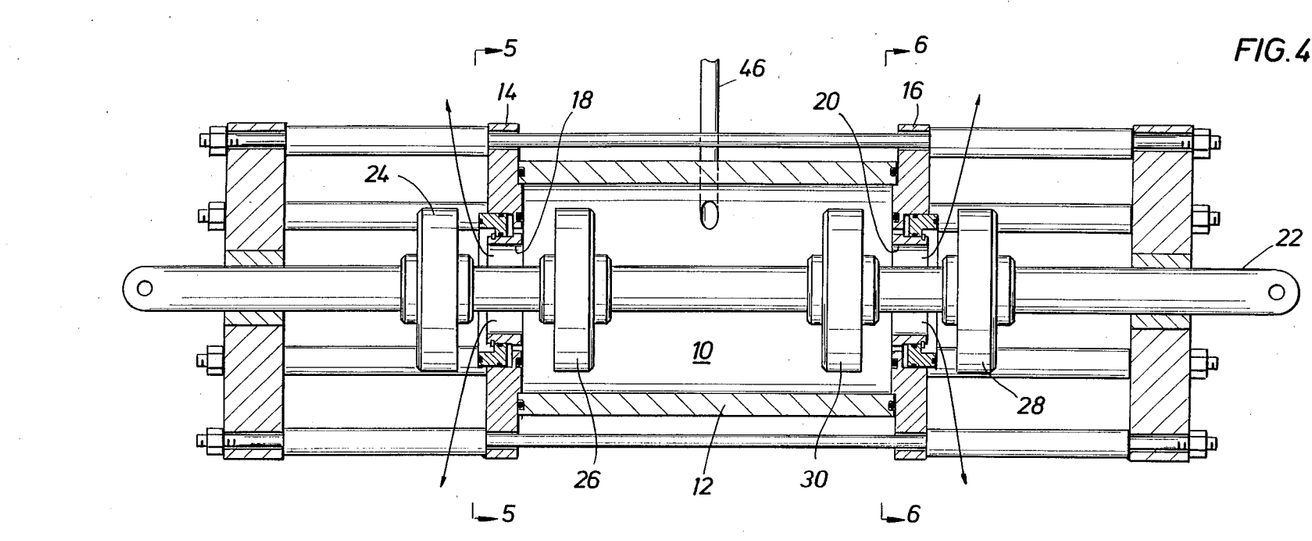
FIG. 4 is a partial cross sectional side view of the device of FIG. 1 showing the shuttle in midstroke and the gas exiting the end exhaust ports.
Figure 5:
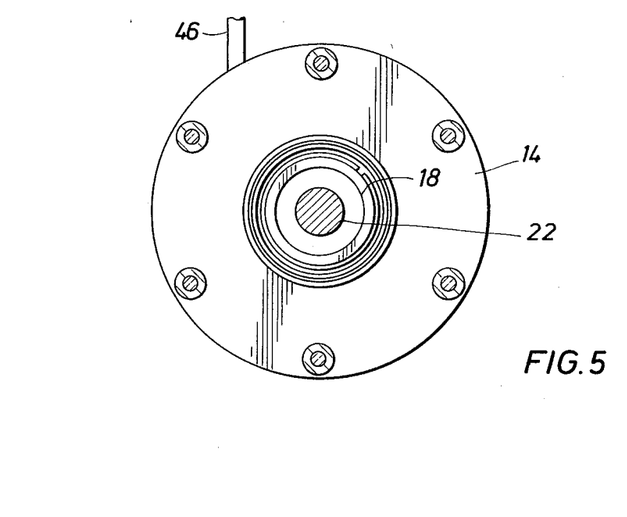
FIG. 5 is a cross sectional end view of the device in FIG. 4 at station 5.
Figure 6:
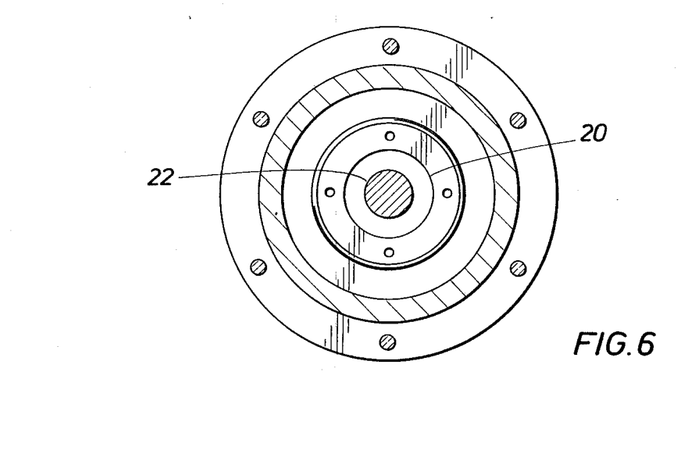
FIG. 6 is a cross sectional end view of the device in FIG. 4 at station 6.

FIG. 5 shows a cross sectional end view of the device in FIG. 4 looking down the throat of left exhaust port 18 as it is firing. The size of port 18 as compared to the diameter of shuttle rod 22 is clearly shown. Similarly, in FIG. 6 which looks out of the throat of exhaust port 20, as it is firing, shows the relative size of the opening. As mentioned above, it is contemplated that end plates 14 and 16 be easily changeable. In this way the sonic signature of the source module may be changed with ease.

The actuator mechanism may be any of several types. An electrical solenoid of a well known design may be used in this service. Other readily available hydraulic or pneumatic actuators capable of moving the device through the stroke required of the shuttle would also be suitable. However, a very desirable actuator is shown, along with its associated valving, in FIGS. 8, 9, 9A, and 10. The actuator is modular and uses the same source, e.g., compressed gas, as does the source module.

The actuator module contains three separate volumes: the actuator cylinder volume 70, the left antechamber volume 72, and the right antechamber volume 74. The left antechamber volume 72 is separated from the actuator cylinder volume 70 by an orifice plate 76. Similarly, the right antechamber volume 74 is separated from the actuator cylinder volume 70 by a right orifice plate 78. A double acting piston 80 resides within the cylinder 82 which forms the outer periphery of actuator cylinder volume 70. Piston 80 is attached to piston rod 84. The diameter of piston rod 84 is typically much smaller than the diameter of the holes found in left and right orifice plates 76, 78. Piston rod 84 is supported by left head 86 and right head 88. Both heads have holes in about their center to allow the passage of piston rod 84 as it moves back and forth during the stroke of piston 80. As with the source module, the actuator module may be held together by a number of studs 90 and nuts 92. An important aspect of the actuator module resides in the fact that the inner sides of the orifice plates have included therein sealing means 94 in left orifice plate 76 and sealing means 96 in right orifice plate 78. Inclusion of these seals, which may be O-rings, results in the effect of having a dual radius piston 80 incorporated in the device. As noted above, the force on a piston is equal to the area of the piston times the pressure of the gas above the piston. So, with piston 80 in the position shown in FIG. 8, the force on the left side of piston 80 is equal to the area inside seal means 94 times the pressure in left antechamber volume 72. The pressure on the right side of piston 80 is equal to the exposed area of piston 80 times the pressure of the gas in actuator cylinder volume 70. The pressures in these two volumes may be adjusted so that piston 80 remains in the position shown in FIG. 8 even though the pressure in volume 70 may be lower than the pressure in volume 72. Note, for instance, that schematicized four-way valve 96 allows high pressure gas into left antechamber volume 72 and low pressure gas from four-way valve 98 into right antechamber volume 74 and into actuator volume 70. To move piston 80 and piston rod 84 to the right, four-way valve 98 is given a quarter turn to the right (as shown in the lower portion of FIG. 9 allowing the low pressure gas in both actuator cylinder volume 70 and right antechamber volume 74 to exhaust. The high pressure gas in left antechamber volume 72 then forces piston 80 to the right.

Figures 9, 9A:
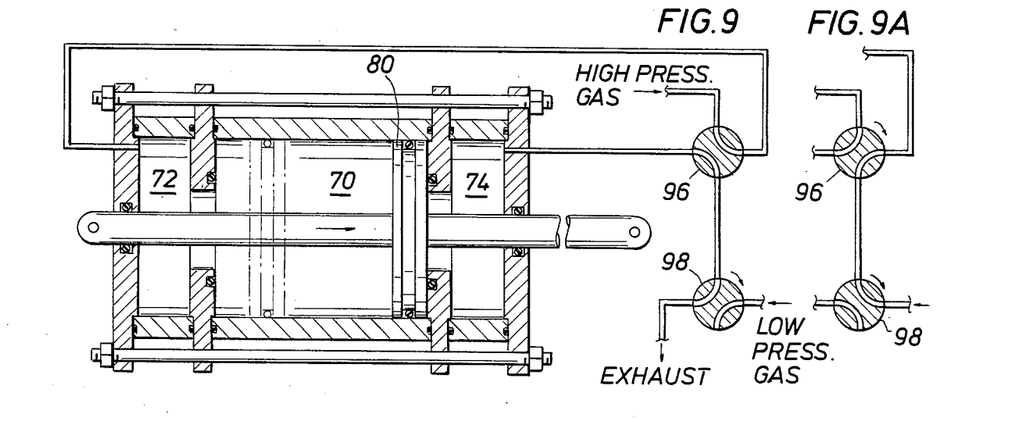

To prepare the actuator module for a return stroke to the left, four-way valve 98 is turned another quarter turn to the right, as is shown in FIG. 9A, to pressure left antechamber volume 72 and actuator cylinder volume 70. Four-way valve 96 is then given a quarter turn to the right to introduce high pressure gas into right antechamber volume 74.

Figure 10:
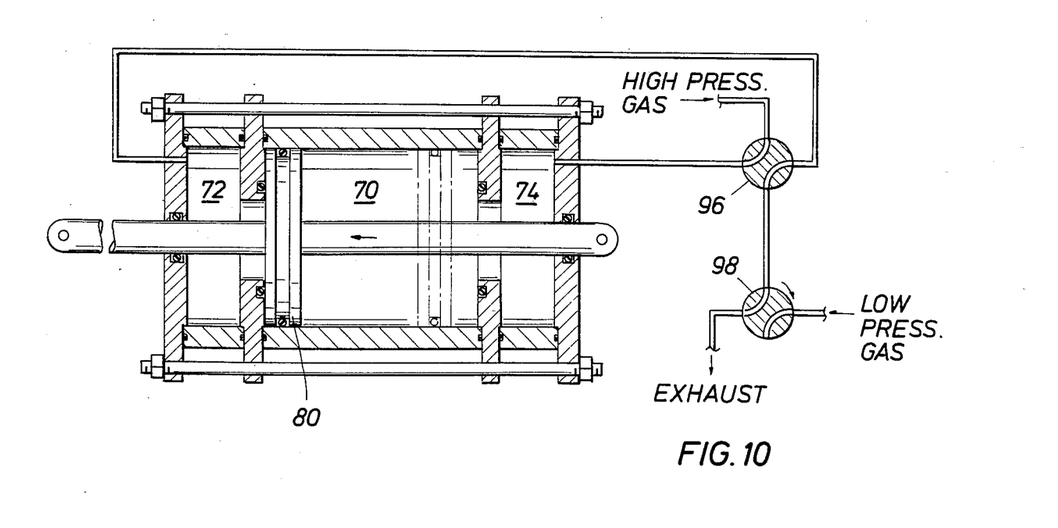

To move piston 80 and piston rod 84 to the left, four-way valve 98 is given a quarter turn to the right, as is shown in FIG. 10, thereby allowing the low pressure gas found in left antechamber volume 72 and actuator cylinder volume 70 to exhaust through four-way valve 96 and four-way valve 98. Fourway valves 96 and 98 would then be returned to the position shown in FIG. 8 to complete the cycle.

Although operation of the actuator module has been illustrated with a pair of four-way valves, it should be apparent to any skilled worker in this art that other known valving means would be equally as operable.

Figure 11:
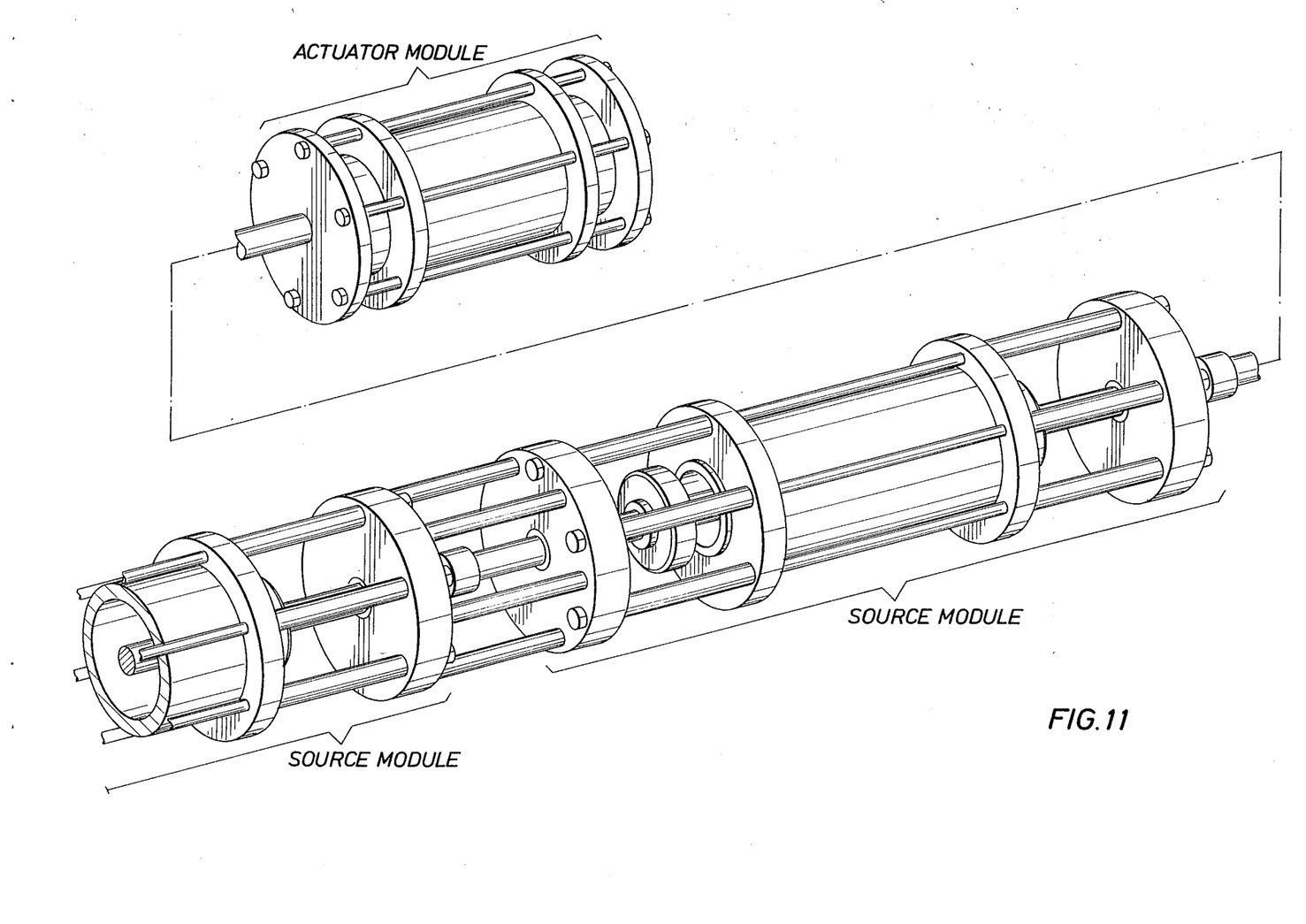
FIG. 11 shows a gang of source modules and an actuator module in perspective.

It is contemplated that the piston rod of the actuator module 84 be connected directly or indirectly to the shuttle rod 22 of the source module. It is also contemplated that several source modules and actuators modules be ganged together as is needed by the seismic operator. A gang of two source modules and an actuator module is shown in FIG. 11. Arrangements similar to that shown in FIG. 11 offer several advantages when operating in the field. There is a timing problem inherent in firing conventional individually operated air guns in that synchronization is a near impossible problem. Operation of the combination shown in FIG. 11 eliminates synchronization problems by operating the double ported source modules with a common actuator.

It is a common practice to utilize a tuned array of air guns, i.e., guns having various interior volumes, to characterize an offshore geologic structure. The greater inertia and friction of the heavier shuttles in the larger volume guns causes those guns to operate more slowly than the small guns. This difference in the rate of operation can also cause a synchronization problem. A tuned array of air guns assembled in the manner shown in FIG. 11 is self synchronizing. The air gun seismic sources described here, additionally, are fairly low in friction. Since there are no moving seals to generate friction or to wear out. The shuttles or piston rods are supported by two bushings or bearings which can be constructed of low friction material.

It should be understood that the foregoing disclosure and description are only illustrative and explanatory of the invention. Various changes in size, shape, materials of construction, in configuration as well as in the details of the illustrated construction, may be made within the scope of the dependent claims without departing from the spirit of the invention.

I claim:

1. A marine seismic source for producing a seismic pulse in a body of water by the release of a pressurized gas comprising:
   a source module further comprising:
      a shuttle which includes:
         a shuttle rod, and four substantially cylindrical valve plates mounted on the shuttle rod,
      a gas-holding chamber disposed about two of said valve plates and a portion of said shuttle rod, said gas-holding chamber having two opposing ends with a sealable exhaust port positioned in each end, said shuttle rod passing through both sealable exhaust ports, said shuttle moveable through a stroke, the valve plates positioned on said shuttle rod such that one of the valve plates about which the gas-holding chamber is disposed and one of the other valve plates seal both exhaust ports at each end of said stroke, each exhaust port being open as the shuttle passes through the stroke, and
      means for introducing pressurized gas to the gas-holding chamber, said pressurized gas released as the shuttle passes through said stroke; and
   an actuator module for moving the shuttle through the stroke.

2. The marine seismic source of claim 1 wherein the gas-holding chamber further comprises:
   a tubular element; and
   a pair of endplates which form opposing ends removably attached to the ends of the tubular element.

3. The marine seismic source of claim 2 wherein the endplates are interchangable so that by changing the endplates the sonic signature of the seismic pulse produced by the device may be changed.

4. The marine seismic source of claim 1 wherein the exhaust ports are annular and the shuttle rod has a diameter less than the diameter of the exhaust port such that an annular space is formed between the shuttle rod and the exhaust port, said annular space large enough to allow substantially all the gas in the chamber to escape as the shuttle passes through the stroke.

5. The marine seismic source of claim 1 wherein two of the valve plates are inside the gas-holding chamber and two of the valve plates are outside the gas-holding chamber, said exhaust ports sealed by one inside valve plate and one outside valve plate at one end of the stroke, said exhaust ports sealed by the other inside valve plate and the other outside valve plate at the other end of the stroke.

6. The marine seismic source of claim 5 wherein the valve plates seal each exhaust port of the gas-holding chamber simultaneously at each end of the stroke.

7. The marine seismic source of claim 5 wherein an extendable seal is disposed about each exhaust port, each extendable seal adapted to seal against one of the outside valve plates.

8. The marine seismic source of claim 1 wherein the valve plates are coaxially mounted on the shuttle rod.

9. The marine seismic source of claim 1 wherein the actuator module comprises:
   a cylinder including a bore and two ends;
   a piston rod;
   a double acting piston having two faces mounted on the piston rod, said piston slideably mounted in the cylinder, the cylinder adapted so the piston rod extends through both said ends, each of the ends including sealing means for sealing an area on the face of the piston in contact with one of the ends, the sealing means sealing an area smaller than the area of the piston face;
   gas inlet means at each end of the cylinder, said gas inlet means within the area sealed by the sealing means;
   means for introducing high pressure control gas to gas inlet means at each end of the cylinder; and
   means for introducing low pressure control gas to the gas inlet means at each end of the cylinder.

10. The marine seismic source of claim 9 wherein said gas inlet means at each end includes:
    an antechamber attached to each cylinder end; and
    at least one orifice through the end of the cylinder for placing the antechamber in fluid communication with the cylinder.

11. The marine seismic source of claim 9 also including valving means to alternate said high and low pressure control gases so as to move said piston through a stroke.

12. A modular marine seismic source for producing a seismic signal in a body of water comprising:
    at least one source module comprising:
       a generally cylindrical gas-holding chamber having first and second opposing ends, said first and second ends having, respectively, first and second exhaust ports positioned therein,
       a shuttle disposed in said gas-holding chamber and passing loosely through said first and second exhaust ports, said shuttle being moveable through a stroke,
       a first pair of shuttle valve plates for sealing said first exhaust port, said first pair comprising a first inner valve plate fixed to said shuttle inside said gas holding chamber and a first outer valve plate fixed to said shuttle outside said gas holding chamber, whereby said first exhaust port is sealed at each end of said stroke of said shuttle,
       a second pair of shuttle valve plates for sealing said second exhaust port, said second pair comprising a second inner valve plate fixed to said shuttle inside said gas holding chamber and a second outer valve plate fixed to said shuttle outside said gas-holding chamber, whereby said second exhaust port is sealed at each end of said stroke of said shuttle, and
       means for providing high pressure compressed gas to said gas-holding chamber; and
    a control module attached to said shuttle and adapted to move said shuttle through said stroke whereby compressed gas is released from said gas-holding chamber into the body of water to create a seismic pulse only during the stroke of said shuttle.

13. The modular marine seismic source of claim 12 wherein said first and second opposing ends are interchangeable so that the signature of the produced seismic signal can be varied by changing said first and second opposing ends.

14. The modular marine seismic source of claim 12 wherein both said first and second exhaust ports are sealed at one end of said stroke by said first outer valve plate and by said second inner valve plate, respectively, and at the other end of said stroke by said first inner valve plate and said second outer valve plate, respectively.

15. The modular marine seismic source of claim 14 wherein both said first and second exhaust ports are sealed substantially simultaneously at each end of each said stroke.

16. The modular marine seismic source of claim 14 including an extendible seal disposed about each said exhaust port and adapted to seal against one of said outside valve plates.

17. The modular marine seismic source of claim 12 wherein said control module comprises:
- a cylinder having a bore and two ends, each end having an opening therein;
- a piston rod extending through said cylinder and each of said ends;
- a double acting piston having two faces, said piston mounted on said piston rod, said piston adapted to slide within said bore as said piston rod and said piston pass through a stroke;
- a sealing means disposed in each said end around each said opening so as to seal an area smaller than the area of said piston face when said piston is in contact with said sealing means at the end of said stroke;
- gas inlet means at each said end of said cylinder;
- means for introducing high pressure control gas to said gas inlet means at each of said cylinder ends; and
- means for introducing low pressure control gas to said gas inlet means at each of said cylinder ends.

18. The modular marine seismic source of claim 17 also including valve means to alternate said high and low pressure control gases so as to move said piston through said stroke.

19. The modular marine seismic source of claim 17 wherein said gas inlet means at each end includes an antechamber attached to each said cylinder end so that the antechamber is in fluid communication with the cylinder.

* * * * *